(12) United States Patent
Jackson et al.

(10) Patent No.: US 8,916,085 B2
(45) Date of Patent: Dec. 23, 2014

(54) PROCESS OF MAKING A COMPONENT WITH A PASSAGEWAY

(75) Inventors: Nicholas Jackson, Davisburg, MI (US); Todd L. Hemingway, Metamora, MI (US); Walter B. Pipp, Jr., Birmingham, MI (US)

(73) Assignee: A. Raymond et Cie, Grenoble (FR)

( * ) Notice: Subject to any disclaimer, the term of this patent is extended or adjusted under 35 U.S.C. 154(b) by 694 days.

(21) Appl. No.: 13/151,307

(22) Filed: Jun. 2, 2011

(65) Prior Publication Data

US 2012/0304449 A1    Dec. 6, 2012

(51) Int. Cl.
| | | |
|---|---|---|
| *B29C 35/08* | (2006.01) | |
| *B29C 41/02* | (2006.01) | |
| *B29C 67/00* | (2006.01) | |
| *F21S 8/10* | (2006.01) | |
| *F21V 29/00* | (2006.01) | |
| *F21K 99/00* | (2010.01) | |
| *F21V 7/22* | (2006.01) | |
| *F21Y 101/02* | (2006.01) | |

(52) U.S. Cl.
CPC ......... *B29C 67/0059* (2013.01); *B29C 67/0055* (2013.01); *B29C 67/0062* (2013.01); *F21V 29/248* (2013.01); *F21K 9/13* (2013.01); *F21V 7/22* (2013.01); *F21Y 2101/02* (2013.01); *F21S 48/325* (2013.01)
USPC ......... 264/401; 264/297.8; 264/308; 264/494

(58) Field of Classification Search
USPC .................. 264/297.8, 308, 401, 494, 497
See application file for complete search history.

(56) References Cited

U.S. PATENT DOCUMENTS

| | | | | |
|---|---|---|---|---|
| 3,386,663 | A | * | 6/1968 | Mandy et al. ............... 239/284.1 |
| 3,466,966 | A | | 9/1969 | Brown |
| 4,157,161 | A | | 6/1979 | Bauer |
| 4,285,470 | A | * | 8/1981 | Roth ........................ 239/284.2 |
| 4,296,949 | A | | 10/1981 | Muetterties et al. |
| 4,334,814 | A | | 6/1982 | McKewan |
| 4,575,330 | A | | 3/1986 | Hull |
| 4,900,210 | A | | 2/1990 | Buchanan et al. |
| 5,143,817 | A | | 9/1992 | Lawton et al. |
| 5,168,604 | A | | 12/1992 | Boville |
| 5,273,383 | A | | 12/1993 | Hughes |

(Continued)

FOREIGN PATENT DOCUMENTS

| | | |
|---|---|---|
| DE | 102006062373 A1 | 6/2008 |
| DE | 102008039160 A1 * | 2/2010 |

(Continued)

OTHER PUBLICATIONS

"Make Your Ideas Real—Give Your Creativity a New Dimension, dimension 3D Printers," Stratasys; company brochure; (2010) 73 pages, Stratasys Document #204400-0002.

(Continued)

*Primary Examiner* — Leo B Tentoni
(74) *Attorney, Agent, or Firm* — Harness, Dickey & Pierce, P.L.C.

(57) ABSTRACT

A component is provided that includes at least one passageway. In another aspect, a component, such as a lamp or a vehicular washer jet, is made of layers of material, a light curable material and/or multiple built-up materials. Another aspect uses a three-dimensional printing machine to emit material from an ink jet printing head to build up a component.

37 Claims, 7 Drawing Sheets

(56) References Cited

U.S. PATENT DOCUMENTS

| | | | |
|---|---|---|---|
| 5,306,098 A | 4/1994 | Lewis | |
| 5,316,245 A | 5/1994 | Ruckwardt | |
| 5,324,151 A | 6/1994 | Szudarek et al. | |
| 5,328,752 A | 7/1994 | Miyazato | |
| 5,337,983 A | 8/1994 | Mailey | |
| 5,401,905 A | 3/1995 | Lesser et al. | |
| 5,503,785 A | 4/1996 | Crump et al. | |
| 5,505,411 A | 4/1996 | Heaton et al. | |
| 5,617,911 A | 4/1997 | Sterett et al. | |
| 5,647,931 A | 7/1997 | Retallick et al. | |
| 5,658,412 A | 8/1997 | Retallick et al. | |
| 5,829,937 A | 11/1998 | Morello et al. | |
| 5,837,172 A | 11/1998 | Pritchard et al. | |
| 5,866,058 A | 2/1999 | Batchelder et al. | |
| 5,906,465 A | 5/1999 | Sato et al. | |
| 5,921,510 A | 7/1999 | Benoit et al. | |
| 5,939,008 A * | 8/1999 | Comb et al. | 264/308 |
| 5,980,230 A | 11/1999 | Dowd et al. | |
| 6,116,832 A | 9/2000 | Wolf et al. | |
| 6,259,962 B1 | 7/2001 | Gothait | |
| 6,336,779 B1 | 1/2002 | Jakob et al. | |
| 6,338,602 B1 | 1/2002 | Gombert | |
| 6,467,650 B1 | 10/2002 | Lesser et al. | |
| 6,520,424 B1 | 2/2003 | Lesser et al. | |
| 6,536,807 B1 | 3/2003 | Raymond et al. | |
| 6,569,373 B2 | 5/2003 | Napadensky | |
| 6,604,692 B2 | 8/2003 | Utz et al. | |
| 6,644,763 B1 | 11/2003 | Gothait | |
| 6,658,314 B1 | 12/2003 | Gothait | |
| 6,669,150 B2 | 12/2003 | Benoit et al. | |
| 6,850,334 B1 | 2/2005 | Gothait | |
| 6,896,839 B2 | 5/2005 | Kubo et al. | |
| 7,073,230 B2 | 7/2006 | Boville | |
| 7,125,512 B2 | 10/2006 | Crump et al. | |
| 7,172,161 B2 | 2/2007 | Rosemann et al. | |
| 7,183,335 B2 | 2/2007 | Napadensky | |
| 7,220,380 B2 | 5/2007 | Farr et al. | |
| 7,225,045 B2 | 5/2007 | Gothait et al. | |
| 7,235,878 B2 | 6/2007 | Owen et al. | |
| 7,255,821 B2 | 8/2007 | Priedeman, Jr. et al. | |
| 7,300,619 B2 | 11/2007 | Napadensky et al. | |
| 7,314,291 B2 | 1/2008 | Tain et al. | |
| 7,341,282 B2 | 3/2008 | Moretti et al. | |
| 7,364,686 B2 | 4/2008 | Kritchman et al. | |
| 7,369,915 B2 | 5/2008 | Kritchman et al. | |
| 7,479,510 B2 | 1/2009 | Napadensky et al. | |
| 7,500,846 B2 | 3/2009 | Eshed et al. | |
| 7,503,528 B2 | 3/2009 | Adams et al. | |
| 7,506,897 B2 | 3/2009 | Bauer | |
| 7,534,015 B2 | 5/2009 | Xu et al. | |
| 7,537,247 B2 | 5/2009 | Trede et al. | |
| 7,593,214 B2 | 9/2009 | Lee | |
| 7,604,768 B2 | 10/2009 | Kritchman | |
| 7,614,590 B2 | 11/2009 | Boville | |
| 7,628,857 B2 | 12/2009 | Kritchman et al. | |
| 7,658,976 B2 | 2/2010 | Kritchman | |
| 7,685,694 B2 | 3/2010 | Zagagi et al. | |
| 7,686,605 B2 | 3/2010 | Perret et al. | |
| 7,713,048 B2 | 5/2010 | Perret et al. | |
| 7,725,209 B2 | 5/2010 | Menchik et al. | |
| 7,736,578 B2 | 6/2010 | Ederer | |
| 7,740,683 B2 | 6/2010 | Thorsson et al. | |
| 7,747,341 B2 | 6/2010 | Dubois et al. | |
| 7,753,320 B2 | 7/2010 | Geiger et al. | |
| 7,767,130 B2 | 8/2010 | Elsner et al. | |
| 7,770,938 B2 | 8/2010 | Bauer | |
| 7,775,456 B2 | 8/2010 | Gopalan et al. | |
| 7,812,365 B2 | 10/2010 | Murayama | |
| 7,829,000 B2 | 11/2010 | Farr et al. | |
| 7,837,248 B2 | 11/2010 | Nedelman | |
| 7,851,122 B2 | 12/2010 | Napadensky | |
| 7,855,449 B2 | 12/2010 | De Graff et al. | |
| 7,887,012 B2 | 2/2011 | Desai et al. | |
| 7,891,095 B2 | 2/2011 | Jonsson et al. | |
| 2002/0171177 A1 | 11/2002 | Kritchman et al. | |
| 2003/0151167 A1 | 8/2003 | Kritchman et al. | |
| 2005/0072113 A1 | 4/2005 | Collins et al. | |
| 2005/0098688 A1 | 5/2005 | Miarka et al. | |
| 2006/0176350 A1 | 8/2006 | Howarth et al. | |
| 2008/0055909 A1 | 3/2008 | Li | |
| 2008/0211132 A1 | 9/2008 | Feenstra | |
| 2008/0237933 A1 | 10/2008 | Hochsmann et al. | |
| 2008/0282527 A1 | 11/2008 | Beck et al. | |
| 2008/0283628 A1 | 11/2008 | Beyer et al. | |
| 2009/0017219 A1 | 1/2009 | Paasche et al. | |
| 2009/0045553 A1 | 2/2009 | Weidinger et al. | |
| 2009/0142619 A1 | 6/2009 | Miyoshi | |
| 2009/0256284 A1 * | 10/2009 | Maguire et al. | 264/401 |
| 2009/0304952 A1 | 12/2009 | Kritchman | |
| 2010/0078509 A1 | 4/2010 | Utz | |
| 2010/0217429 A1 | 8/2010 | Kritchman et al. | |
| 2010/0224707 A1 | 9/2010 | Rathey et al. | |
| 2010/0237171 A1 | 9/2010 | Rathey et al. | |
| 2010/0270713 A1 | 10/2010 | Frangov et al. | |
| 2010/0294549 A1 | 11/2010 | Laville et al. | |
| 2011/0074065 A1 | 3/2011 | Batchelder et al. | |
| 2011/0076495 A1 | 3/2011 | Batchelder et al. | |
| 2011/0076496 A1 | 3/2011 | Batchelder et al. | |
| 2011/0101127 A1 | 5/2011 | Beyer et al. | |
| 2011/0192432 A1 * | 8/2011 | Lehmann et al. | 134/198 |
| 2012/0033002 A1 | 2/2012 | Seeler et al. | |

FOREIGN PATENT DOCUMENTS

| | | |
|---|---|---|
| EP | 0490546 A1 | 6/1992 |
| EP | 2156942 A1 | 2/2010 |
| FR | 2935031 A1 | 2/2010 |
| GB | 1208543 A | 10/1970 |
| WO | WO-2005/089477 A2 | 9/2005 |
| WO | WO-2007016469 A2 | 2/2007 |
| WO | WO-2007/149436 A1 | 12/2007 |
| WO | WO-2011053170 A1 | 5/2011 |
| WO | WO-2011135087 A1 | 11/2011 |

OTHER PUBLICATIONS

Brain, Marshall. "How Stereolithography 3-D Layering Works," HowStuffWorks.com.; http://www.howstuffworks.com/stereolith.htm; article, Oct. 5, 2000, 6 pages.

"Stereolithography," Wikipedia, http://en.wikipedia.org/wiki/Stereolithography; article, last modified Jun. 1, 2011, 5 pages.

"3D Printing," Wikipedia, http://en/wikipedia.org/wiki/3D_printing; article, last modified Jun. 20, 2011, 5 pages.

"Connex500, The First Multi-Material 3-Dimensional Printing System", Objet Geometries Ltd.; article, (2010), 2 pages.

"PolyJet Matrix™ Technology," Objet Geometries Ltd.; brochure, (2009), 6 pages.

"Automotive," Objet Geometries, Inc.; article, http://www.objet.com/INDUSTRIES/Automotive; Sep. 12, 2010, 1 page.

"Keeping AP Racing on Track," Objet Geometries Ltd.; printout, www.2objet.com, (2007), 2 pages.

"The Power of Two, Case Study," Objet Geometries Ltd.; printout, www.objet.com, (2010), 2 pages.

"A Factory on Your Desk,"; The Economist Technology Quarterly; article, Sep. 5, 2009, pp. 26-29.

Rao. M.; Webcourse publication IIT-Delhi/Computer Aided Design & Manufacturing II—Module G(4): Rapid Prototyping (Apr. 18, 2011).

"Consumer Goods", Case Study, Objet Geometries Ltd., printout, May 5, 2011, http://objet.com/INDUSTRIES/consumer_Goods/.

"EOS in brief; e-Manufacturing Solutions", EOS Worldwide, brochure (2010).

Direct metal laser sintering, Wikipedia, http://en.wikipedia.org/wiki/Direct_metal_laser_sintering, article, last modified Mar. 23, 2011, 3 pages.

Sprovieri, John, "Fastening: Christmas Trees Ain't Just for December", Assembly Magazine, downloaded from Internet on Aug. 5, 2011, http://www.assemblymag.com/Articles/Article_Rotation/BNP_GUID_9-5-2006_A_100000.

(56) References Cited

OTHER PUBLICATIONS

EOSINT S 750 product brochure, "Double laser-sintering system for the direct, tool-less production of sand cores and moulds for metal castings" downloaded from internet Apr. 1, 2011, http://img.directindustry.com/pdf/repository_di/5078/eosint-s-750-21926_1b.jpg.

EOS e-Manufacturing Solutions, brochure, EOS GmbH Electro Optical Systems, downloaded from internet Apr. 1, 2011, www.eos.info.

"Laser sintering—versatile production of tooling inserts, prototype parts and end products from metal powder", International Powder Metallurgy Directory,http://www.ipmd.net/articles/articles/001087.html, downloaded Apr. 1, 2011.

EOSINT M 280: "Laser-sintering system for the production of tooling inserts, prototype parts and end products directly in metal." Product brochure, EOS e-Manufacturing Solutions, downloaded from internet Apr. 1, 2011, http://www.eos.info/en/products/systems-equipment/metal-laser-sintering-systems.html.

"Digitalized e-Manufacturing workflows: Direct Metall Laser-Sintering technology enables high quality parts, cost efficiency and time savings", press release Mar. 22, 2011, EOS Electro Optical Systems Gmbh, downloaded from internet Apr. 1, 2011, http://www.eos.info/en/news-events/press-relesases/pressdetails/article/103/digitalisier.html.

"Objet. The Power to Create. Jaguar Land Rover", 3Dprinting & Rapid Prototyping by Objet Geometries Ltd.; printout, <http://www.objet.com>/, May 31, 2011.

"Installation Instructions for Towel Bar", Danze (sold in U.S. prior to Jun. 2011).

"Hillman Fasteners 10 Pack #8 Zinc EZ Anchor 41408", downloaded from internet May 19, 2011: <http://www.thegreathardwarestore.com/Hillman-Fasteners-10-Pack-8-Zinc-EZ-Anchor-41408-p/848187.htm>.

"Hillman Fasteners 20 Pack #6 Plas EZ Anchor 41410", downloaded from internet May 19, 2011: <http://www.thegreathardwarestore.com/Hillman-Fasteners-20-Pack-6-Plas-EZ-Anchor-41410-p/848173.htm>.

EOS M 270 3TRPD Shown in Real Time—Machine and Scintering Pattern (published Apr. 1, 2011); pictures; 2 pages.

Evans, C.; "What is Rapid Prototyping?"; XP002681573; http://www.articlesbase.com/industrial-articles/what-is-rapid-prototyping-3699771.html; Nov. 11, 2010; 1 page.

Colton, Prof. J.S., "Bolt Manufacture: Process Selection", XP002681623, Georgia Institute of Technology, URL: www-old.me.gatech.edu/jonathan.colton/me4210/procselect1.pdf, 1999, pp. 1-37.

"TIXOS-Implants Line Manufactured by Titanium Powder Laser Microfusion", XP002681624, Smile Dental Journal, vol. 5, No. 3, Sep. 1, 2010, p. 56.

"3D printing the printed world", XP-002683243, http://www.economist.com/node/18114221/print, Feb. 10, 2011, 9 pages.

Leno, Jay; "Jay Leno's 3D Printer Replaces Rusty Old Parts," Popular Mechanics, http://www.popularmechanics.com/cars/jay-leno/technology/4320759, Jun. 8, 2009, 3 pages.

Friedman, Peter; "The Achilles' Heel of 3D Printing—Why 'additive manufacturing' isn't expected to take over large scale industrial production any time soon", Innovation Investment Journal, http://www.iijiij.com/2012/12/30/the-achilles-heel-of-3d-printing-015281/print/, downloaded Jan. 29, 2013, Dec. 30, 2012, 6 pages.

* cited by examiner

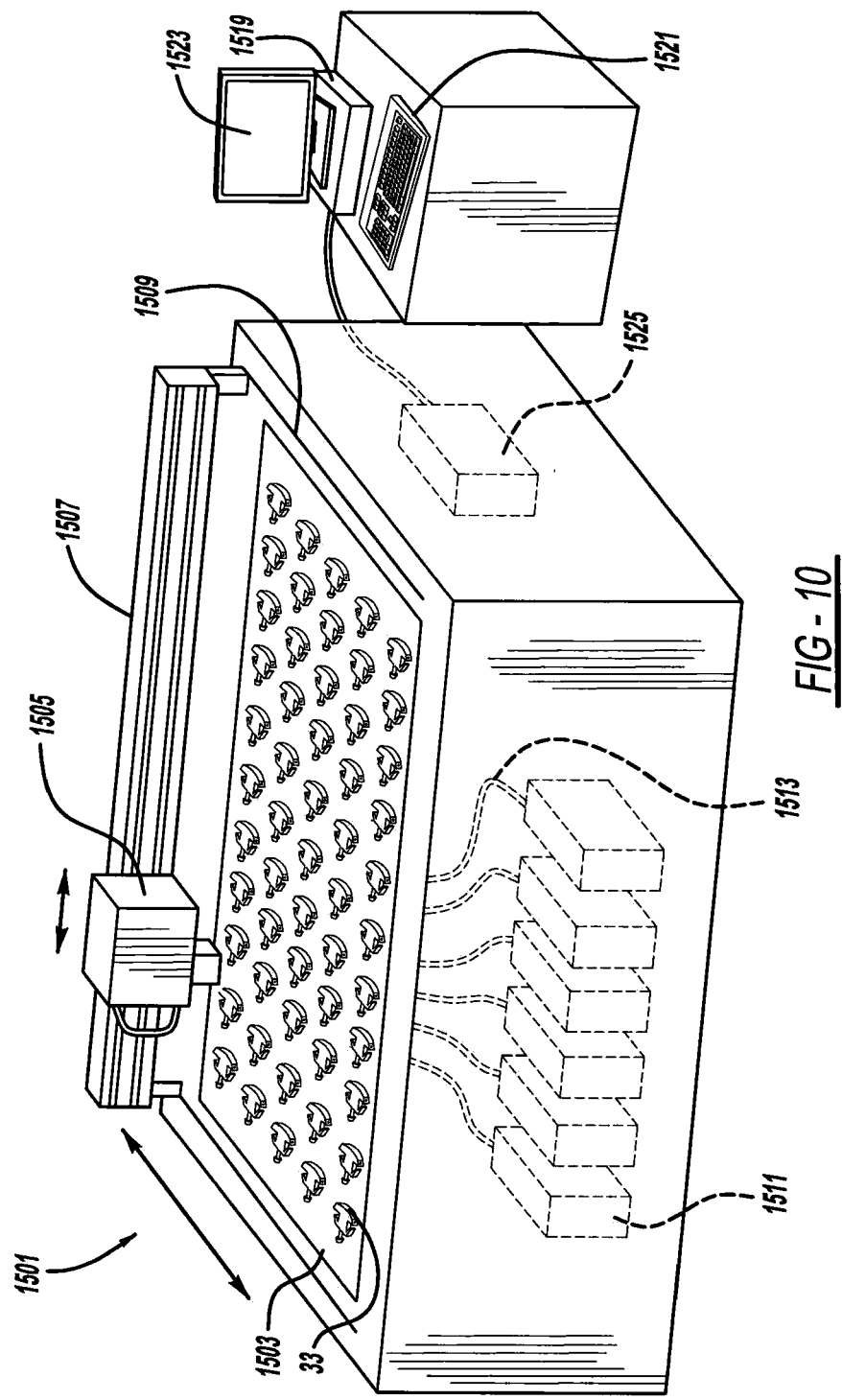

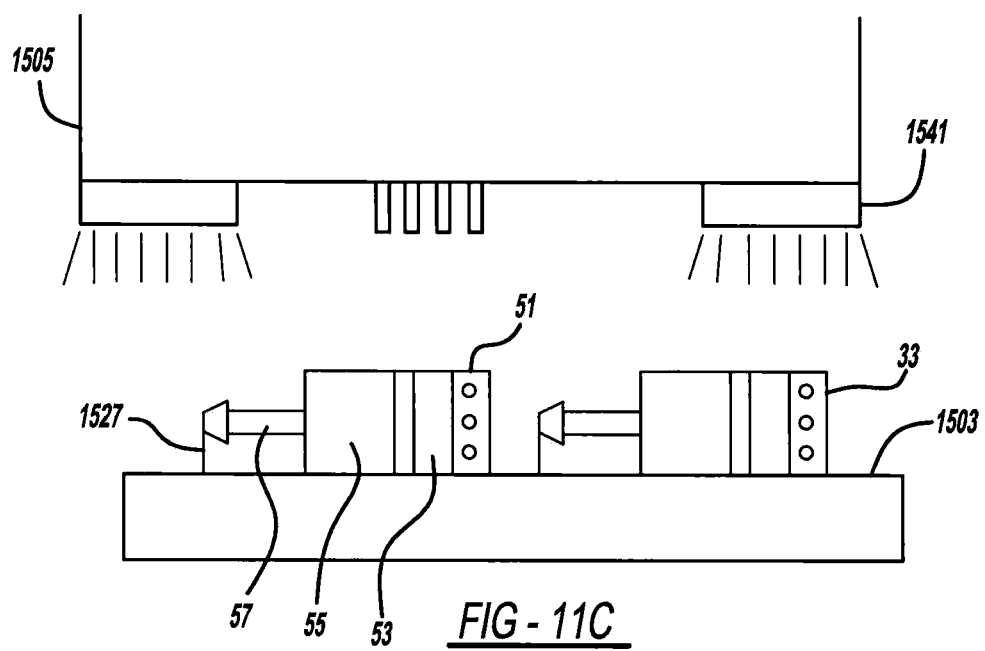

PROCESS OF MAKING A COMPONENT WITH A PASSAGEWAY

BACKGROUND AND SUMMARY

The present invention relates generally to components and more particularly to manufacturing of a component with a passageway.

Traditionally, polymeric parts are made by injection or extrusion molding. In such processes, a heated polymeric liquid is inserted into match metal dies under high pressure, after which the dies are internally cooled in order to cure the manufactured parts. Air is vented from the die cavity when the molten polymer is injected therein. Injection and extrusion molding are ideally suited for high volume production where one hundred thousand or more parts per year are required. These traditional manufacturing processes, however, disadvantageously require very expensive machined steel dies, which are difficult and time consuming to modify if part revisions are desired, and are subject to problematic part-to-part tolerance variations. Such variations are due to molding shrinkage during curing, molding pressure differences, part warpage due to internal voids and external sink marks, and the like. The expense of this traditional die tooling makes lower volume production of polymeric parts prohibitively expensive. These disadvantages are especially apparent for conventional automotive vehicle washer jets where multiple components need to be separately injection molded then assembled together to create the otherwise die-locked internal passageways.

It is further known to make head lamps for automotive vehicles with a light emitting diode ("LED"). It is problematic, however, to cool these very hot lamps. Exemplary traditional devices are disclosed in U.S. Pat. Nos. 7,812,365 entitled "Heat Dissipation Member, Semiconductor Apparatus and Semiconductor Light Emitting Apparatus" which issued to Murayama on Oct. 12, 2010, 7,855,449 entitled "Cooling Device for a Light-Emitting Semiconductor Device and a Method of Manufacturing such a Cooling Device" which issued to De Graff et al. on Dec. 21, 2010, and 7,235,878 entitled "Direct Cooling of LEDs" which issued to Owen et al. on Jun. 26, 2007. These patents are incorporated by reference herein. Conventional light emitting diode lamps for automotive vehicles require very complicated and expensive constructions including coolant tubes running from a vehicle radiator to each lamp with a six piece lamp housing being machined from aluminum and then assembled together.

It is also known to use stereolithography to produce non-functional polymeric parts (not believed to include washer jets or lamps). Such conventional stereo lithography methods use a laser to create a layered part on a moving platform within a vat of liquid polymer. The part rises from the liquid as it is being made. These parts are extremely slow to produce and impractically brittle.

In accordance with the present invention, a component is provided that includes at least one passageway. In another aspect, a component, such as a lamp or a vehicular washer jet, is made of layers of material, a light curable material and/or multiple built-up materials. Another aspect uses a three-dimensional printing machine to emit material from an ink jet printing head to build up a component including at least one internal and/or fluid-carrying passageway. A further aspect provides a method of making a washer jet and/or lamp by depositing material in layers and/or a built-up additive arrangement. Yet another aspect makes a washer jet and/or lamp by depositing material in an environment where the component is essentially surrounded by a gas, such as air, during the material deposition. A method of making a multi-material and/or pre-assembled washer jet and/or lamp component is also employed in another aspect.

The present automotive components and method are advantageous over traditional devices. For example, the present components and method do not require any unique tooling or dies, thereby saving hundreds of thousands of dollars and many weeks of die manufacturing time. Furthermore, the present method allows for quick and inexpensive design and part revisions from one manufacturing cycle to another. In another aspect, part-to-part tolerance variations are essentially non-existent with the present components and method such that at least ten, and more preferably at least forty, identical washer jets and/or lamps can be produced in a single machine manufacturing cycle. For other aspects of the present components and method, multiple head openings, a stationary support for the built-up components within the machine, and the ambient air manufacturing environment allow for increased manufacturing speed, simpler machinery and ease of access to the manufactured components. It is also noteworthy that one aspect of the present washer jet and/or lamp and method are advantageously capable of creating die-locked part configurations, for example, three dimensionally curved or offset angled internal passageways in a single piece part, that would otherwise be prohibitively expensive, if not impossible, to produce with conventional dies. In other aspects, the present components and method reduce post-manufacturing assembly by creating mating parts in a pre-installed or pre-assembled condition within the same manufacturing machine cycle; for example, this can apply to covers, inserts and/or seals. Materials of different characteristics, such as flexibility, tensile strength, hoop strength, chemical resistance, UV fade resistance, or even color can be deposited to create different sections of the component at essentially the same time. Additional advantages and features of the present invention can be found in the following description and appended claims as well as in the accompanying drawings.

BRIEF DESCRIPTION OF THE DRAWINGS

FIG. 10 is a perspective view showing a machine manufacturing the first embodiment washer jets, with an upper cover of the machine removed; and FIGS. 11A-C are a series of diagrammatic side views showing the machine building up the first embodiment washer jets.

DETAILED DESCRIPTION

Figure 1:
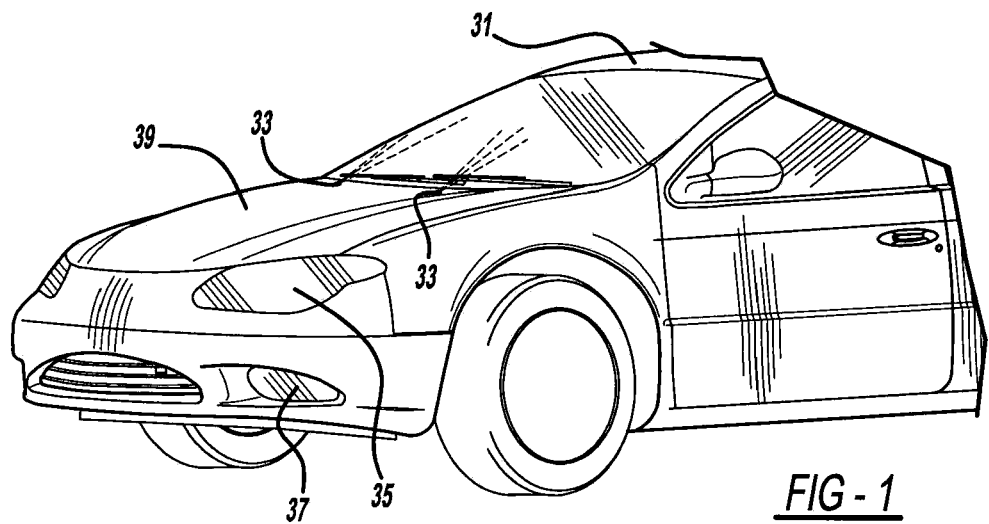
FIG. 1 is a perspective view showing washer jets and lamps on an automotive vehicle of the present invention.

FIG. 1 illustrates an automotive vehicle 31 including various three-dimensionally printed components, including window washer jets 33 and lamps 35 and 37. Washer jets 33 are fastened to a vehicular body panel such as a hood 39 for a windshield use, or a roof or lift gate panel for a back window use. Exterior lamp 35 is mounted to an upper radiator support panel or front fender panel when acting as a head lamp, alternately to a tail panel or rear fender panel when acting as a tail lamp, and to a trunk lid or roof if acting as a center high mount stop lamp. The lamp may alternately serve as a fog or running lamp 37.

Figure 2:
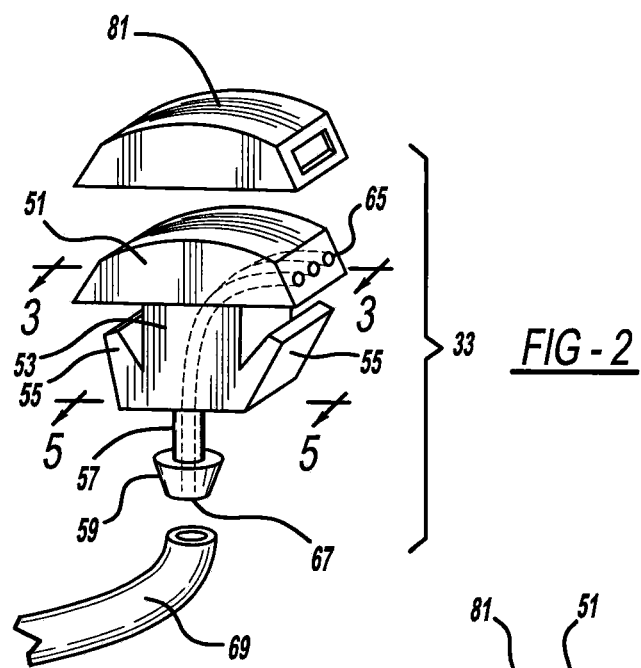
FIG. 2 is an exploded perspective view showing a first embodiment of the washer jet of the present invention.
Figure 3:
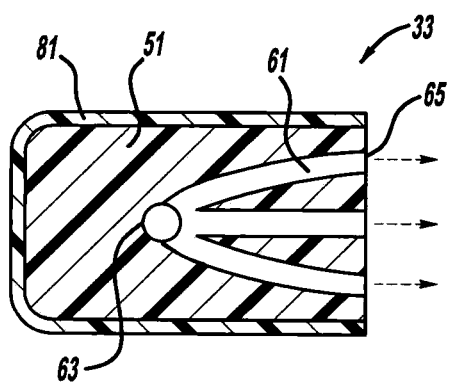
FIG. 3 is a cross-sectional view, taken along line 3-3 of FIG. 2, showing the first embodiment washer jet.

Referring to FIGS. 2 and 3, each washer jet 33 includes a laterally enlarged head 51, a body 53 longitudinally extending to a bottom of head 51, and a pair of wings 55 which are flexibly attached to lateral sides of body 53. Additionally, a rigid conduit 57 protrudes in a longitudinal direction from a distal end of body 53 with a generally frusto-conically shaped nipple 59 at an end thereof. Multiple curved washer fluid-carrying passages 61 branch from a central curved passageway 63 and end at outlets 65 facing the vehicular windshield. Central passageway 63 downwardly extends in a longitudinally offset direction relative to branch passageways 61, and ends at an inlet 67 within nipple 59. A flexible tube 69 is coupled around nipple 59 for supplying pressurized washer liquid thereto.

Head 51, body 53, wings 55, conduit 57 and nipple 59 are all three-dimensionally printed from a light curable polymeric material in an additive layered manner as will be further discussed hereinafter. The sections of washer jet 33 are integrally formed as single piece such that passageways 61 and 63 are completed surrounded by the printed polymeric material except at inlet 67 and outlets 65. This integrated part construction and three-dimensional printing process is highly advantageous for creating a single piece washer jet surrounding the three-dimensionally curved fluid-carrying passageways, especially as compared to conventional multi-piece devices. Such conventional multi-piece devices are shown in U.S. Pat. No. 7,775,456 entitled "Fluidic Device Yielding Three-Dimensional Spray Patterns" which issued to Gopalan et al. on Aug. 17, 2010, and U.S. Pat. No. 4,157,161 entitled "Windshield Washer" which issued to Bauer on Jan. 5, 1979; both of which are incorporated by reference herein. In contrast, the post-manufacturing assembly, dedicated tooling and sub-component part tolerances are advantageously avoided with the present three-dimensionally printed washer jet component.

In one configuration, a separate cap 81 is snap-fit onto head 51. Cap 81 is painted to match the exterior body color of the vehicle or is otherwise created from an ultraviolet light-fade resistant, polymeric material. Cap 81 in this variation is a separately created piece that can either be made by three-dimensional printing for low volume production or injection molding if greater volumes are desired. A variation is shown in FIG. 3 where cap 81 is integrally printed as part of each associated layer of head 51. In this configuration, cap 81 is an ultraviolet light-fade resistant, polymeric material that is laid down the same machine head pass as with the underlying and more structurally durable polymeric material of head 51 and body 53.

Distal ends of wings 55 inwardly flex toward the longitudinal centerline through body 53 when linearly inserted into the hole within the workpiece body panel 39 (see FIG. 1). After passing therethrough, wings 55 return to their nominal diagonally outboard state such that the distal ends thereof firmly abut against a backside surface of the workpiece panel to deter undesired removal through the hole therein. Thus, the extraction force is at least twice that of an insertion force of washer jet 33 into the panel hole.

Figure 5:
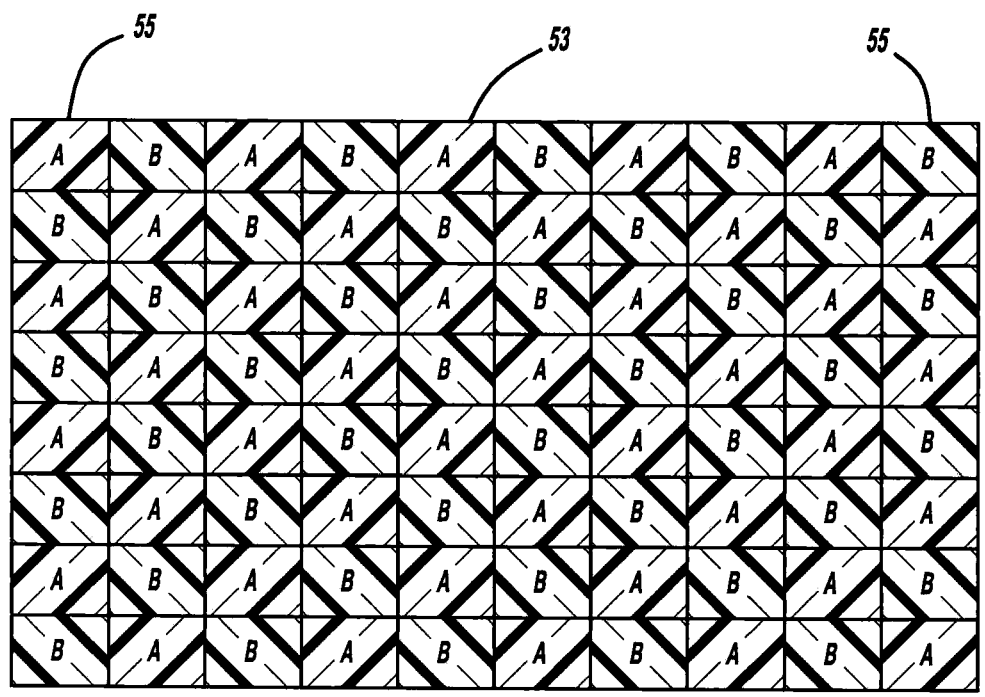
FIG. 5 is a diagrammatic cross-sectional view, taken along line 5-5 of FIG. 2, showing an alternate embodiment washer jet.

FIG. 5 illustrates an alternate configuration for a bottom section of body 53 and wings 55. During the manufacturing programming on a computer controller, the operator varies the material type in a repeating and alternating pattern in one or more localized areas, or alternately across the entire component. A first material is denoted as "A" and a second and different material is denoted as "B." For example, the A material can be a more flexible and resilient polymeric material while the B material is a more durable and rigid polymeric material. This can be done on a pixel-by-pixel computer basis in the computer controller which then causes the machine head to deposit the different A and B materials immediately adjacent to each other, for example in adjacent 1 mm² or 1 mm diameter areas, in the same alternating manner when creating that portion of component. This can be done either on a one pixel-by-pixel manner, two pixel-by-pixel manner, or various other predetermined pixel quantity combinations depending on the desired material characteristics. It is envisioned that this will have the same effect as if the multiple materials were compounded together since the part will essentially exhibit the synergistic benefits of both materials. It should also be appreciated that two or more materials may be alternated in this manner and/or that the pattern can be varied throughout different sections of the component. For example, for the section 5-5 location adjacent the bottom end of body 53 and wings 55, there may be more pixels of the flexible polymeric material and less of the rigid polymeric material, while the section 3-3 location through head 51 may be all or a majority of the rigid polymeric material. These alternating materials are integrally bonded together during the light curing process.

Figure 4:
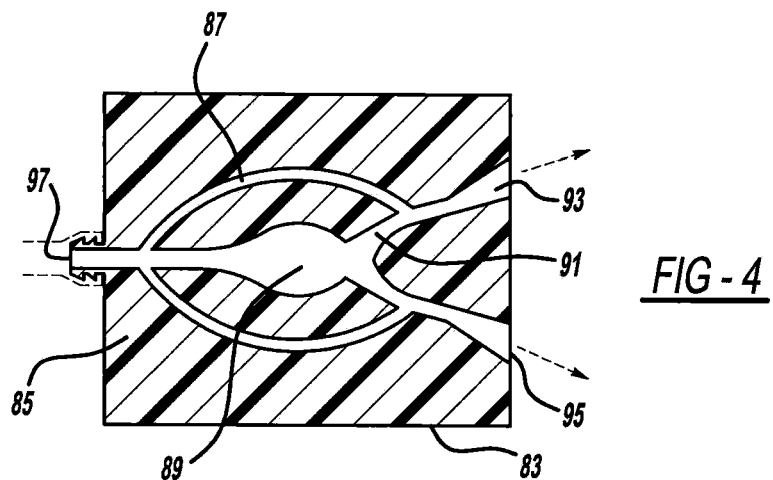
FIG. 4 is a cross-sectional view, like that of FIG. 3, showing a second embodiment washer jet.

FIG. 4 shows a second embodiment washer jet 83. In this construction, a head 85 includes offset angled, including arcuate, washer fluid-carrying passageways 87 of curved shapes, enlarged internal chambers 89, and varying sized cross-sectional areas 91 and 93, all being surrounded by a printable polymeric material of a one-piece head 85 except at outlets 95 and an inlet 97. The specific passageway configuration illustrated provides a three-dimensional fluid spray pattern. A body and snap-in wings are also provided in an integrally created, three-dimensionally printed manner.

The details of lamps 35 and 37 can best be seen in FIGS. 6-9. A lamp assembly 101 includes an outer housing 103, a base 105, light emitting diodes 107 and a lens 109. Housing 103 has a generally frusto-conical shape with an internal cavity therein. An open wider end is provided with an outwardly turned and generally circular flange while the opposite narrower end has a central aperture through which a section of base 105 extends. In one configuration where base 105 is separately manufactured from housing 103, spiraling screw threads 141, an adhesive or another mechanical attachment is provided to secure the base within the housing. In a different configuration where base 105 and housing 103 are integrally printed in the same machine cycle, such a mechanical attachment may not be necessary since the three-dimensionally printable materials creating the base and housing are additively layered and light cured in each machine head pass thereby bonding these materials (whether the same or different polymers) in a single-piece manner.

Base 105 includes multiple sockets within which are received LEDs 107 to provide lamp illumination through lens 109. A pair of metallic terminals 143 serve to plug the lamp assembly into an electrical circuit of an automotive vehicle. These terminals 143 are connected to electrically conductive traces which, in turn, are connected to LEDs 107 inside of base 105. In one configuration, the insulative polymeric material of base 105 is injection molded around the stamped metal terminals and traces 143, but this configuration does not benefit from the printed advantages. In another configuration, the metal terminals and traces 143 are manually assembled into the polymeric portion of base 105 which is printed on an additive layer-by-layer basis using the three-dimensional printer machine.

A pair of O-ring seals 111 and 113 are provided between housing 103 and base 105 adjacent ends thereof. These seals are integrally printed from a light, curable and three-dimensionally printable polymer as part of the housing and/or base. Seals 111 and 113 are of a more resilient material than are housing 103 and base 105.

It is envisioned that two different types of cooling pathways may be used with the present lamp assembly 101. Housing 103 includes an inlet 121 and outlet 123, both of which are attached to a vehicular radiator via flexible tubes, thereby providing a coolant circulation path for the liquid flowing therebetween. A spiraling external passageway 125 surrounds a middle section of base 105. This passageway 125 is defined between housing 103 and base 105. Alternately or additionally, an internal fluid passageway 127 is provided entirely within the single-piece base 105 but for the open inlet and outlet thereof. These passageways both have a three-dimensionally angularly offset, for example curved, direction of elongation. It is alternately envisioned that the external passageway can be depressed into an internal surface of housing 103 instead of outside of base 105. All of these passageway configurations allow for coolant fluid to flow adjacent the high intensity LEDs 107 in order to prevent overheating of the lamp during usage.

A concave end of base 105 acts as a reflector for the light emitted from LEDs 107. In one configuration, a reflective layer 115 is vacuum metalized upon the concave end of base 105 as a separate process. In another configuration, a three-dimensionally printable and light, curable metallic material is printed as reflective layer 115 onto base 105 in the additive, layer-by-layer manner in the same machine cycle from the three-dimensional printing machine. In an alternate arrangement, reflective layer 115 can be integrally printed from a high gloss and heat durable polymeric material on top of a different polymeric material for the remainder of base 105.

Furthermore, lens 109 is a transparent or colored member defining a bulb or LED cavity between it and the reflective portion of base 105. In one configuration, lens 109 is a printable and light curable polymeric material that is separately or integrally printed with base 105 and/or housing 103. In another configuration, lens 109 is glass and separately attached to either base or housing through screws or the like. An additional seal may optionally be provided between the lens and base 105 and/or housing 103.

Figure 11A:
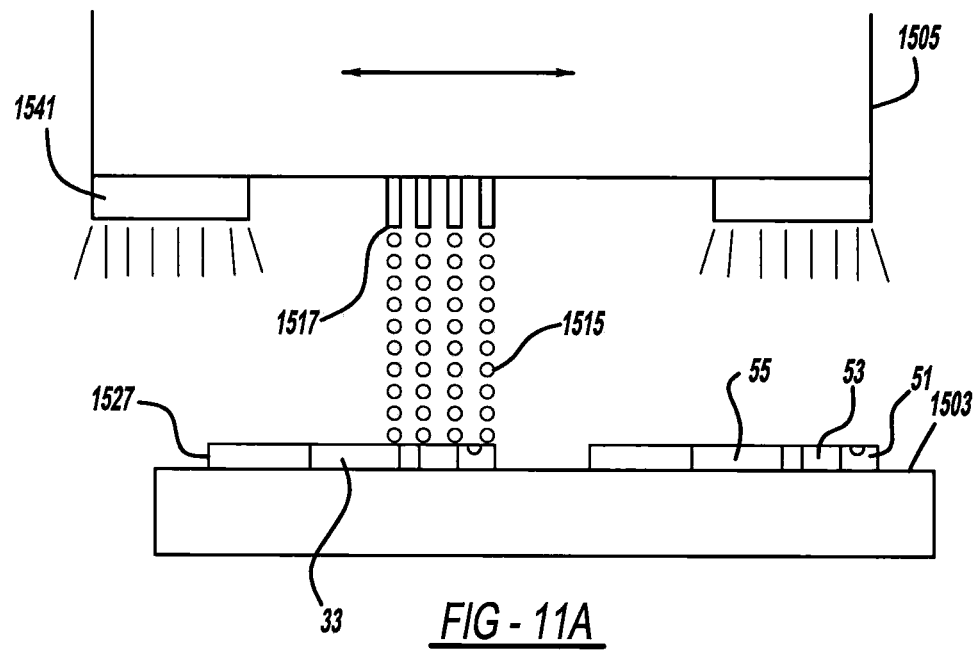
Figure 11B:
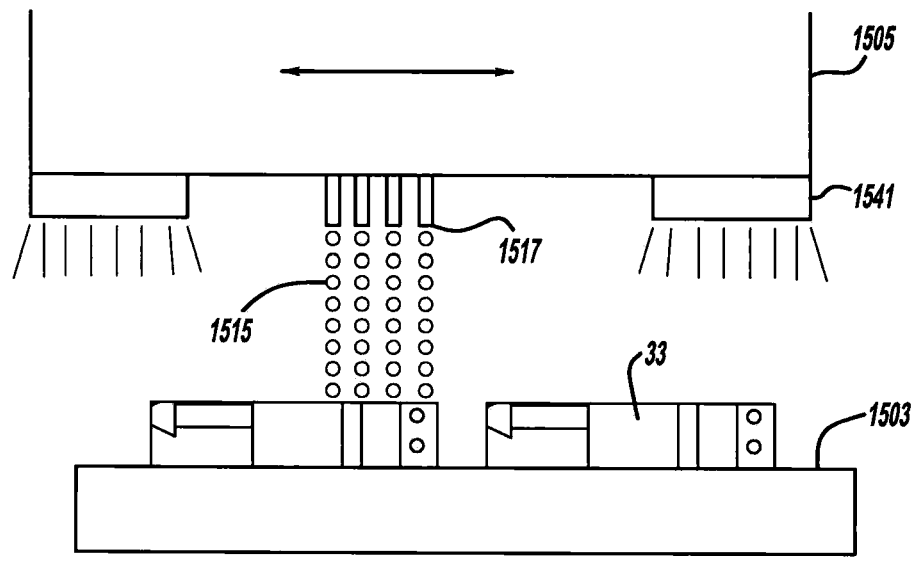

The preferred manufacturing machine and process are shown in FIGS. 10-11C. A three-dimensional printing machine 1501 includes a stationary support surface 1503 upon which a set of identical washer jets 33 (or alternately, lamps) are created. Machine 1501 further includes at least one ink jet printer head 1505, and preferably eight heads, which traverse side to side along one or more gantry rails 1507 by an electric motor or other automatically controlled actuators. The gantry rail also moves fore and aft above support surface 1503 along outboard tracks 1509, driven by an electric motor or other automatically controlled actuator. At least two storage tanks 1511 or removable cartridges are connected to head 1505 via supply hoses 1513 in order to feed the same or different polymeric materials 1515 contained within each tank 1511 to multiple ink jet printer openings 1517 in head 1505. Openings 1517 may constitute an array of 10×10 or even 100×100 nozzles, and more preferably 96 nozzles, arranged in a linear array such that multiple material flows are simultaneously emitted during a single head pass. The material is preferably an ultraviolet light-curable photopolymer in the form of a powder and water mixture. Alternately, a spool containing an elongated and flexible string or filament of the polymeric material can be fed to the head, melted and emitted onto the support surface as a layered and continuous string.

A computer controller 1519, having an input keyboard 1521, an output display screen 1523, and a microprocessor, is connected to a central processing unit 1525 of machine 1501 to control the feed of material from tanks 1511 and the actuator movement of head 1505 relative to support surface 1503. The machine user downloads a CAD file containing a design of the washer jet (or alternately, lamp) into non-transient computer memory, such as RAM, ROM, a hard drive or removable storage, associated with computer controller 1519. The user then uses software instructions stored in the memory to digitally lay out the desired quantity of the components onto support surface 1503 and position the washer jets in a manufacturing orientation, while adding any supports 1527 or pixel bridges to the design which are later removed after the manufacturing. The user also inputs the material(s) to be used in the manufacturing, whereafter the microprocessor in computer controller 1519 and CPU 1525 runs the software to cause head 1505 to begin its movement and material deposition in order to create the set of washer jet components.

During the first pass of head 1505, ink jet printing openings 1517 emit streams of polymeric material 1515 and lay down a first layer, constituting a bottom external surface with a first transverse pass of head 1505; for the first preferred embodiment washer jet, the bottom external surface as shown is an outside surface of the thickest section which is at the side of washer jet head 51 (or cap 81 if integral). This first pass lays down a material thickness of approximately 0.1-1.0 mm of the washer jet. As the machine head continues in its transverse path, it will also lay down the same exact material layer for each adjacent washer jet 33 being manufactured in the same manufacturing cycle. Alternately, if the array of openings is large enough, spread out or contained on multiple washer jet heads, then multiple heads can be simultaneously deposited. One or more ultraviolet lights 1541 are attached to head 1505 which serve to emit light onto the layered material immediately after its deposition which binds together and cures the layer of material deposited. After the first layer has been deposited for each of the multiple washer jets (or lamps), head 1505 then emits a second layer of polymeric material 1515 upon the already deposited first layer which is then bound to the first layer when cured by lights 1541. This layering and curing is repeated many times, for example, with more than fifty layers or head passes, until the washer jet is fully created.

Material is deposited where computer controller 1519 informs head 1505 that a wall or other polymeric formation is desired but head 1505 will not deposit any material where a passageway or other open area is present in the CAD drawing of the component. The polymeric material is stacked in many layers thereby creating the entire washer jet (or lamp) as an integral and single piece part in a gaseous, particularly ambient and unpressured air, environment inside an enclosure of machine 1501. In other words, the washer jets are all surrounded by air except for the first layer which contacts support surface 1503, during the entire manufacturing cycle. As used herein, manufacturing or machine "cycle" refers to the time period from which the head begins depositing the first layer of material until when the head deposits the final layer of material for the completed part and is cured in the machine. After the machine cycle is complete, the user manually removes the manufactured washer jets from support surface 1503, such as by use of a putty knife or other removal tool. At least forty washer jets (or lamps) are made in a single machine cycle, which is preferably less than ninety minutes. In one optional step, each removed washer jet is dipped into a hardener, solvent or final curing solution, which also serves to dissolve any supports or bridges, especially when they are made of a solvent-dissolvable material, different from the primary material defining the head, body, wings and conduit of the washer jet.

Figure 6:
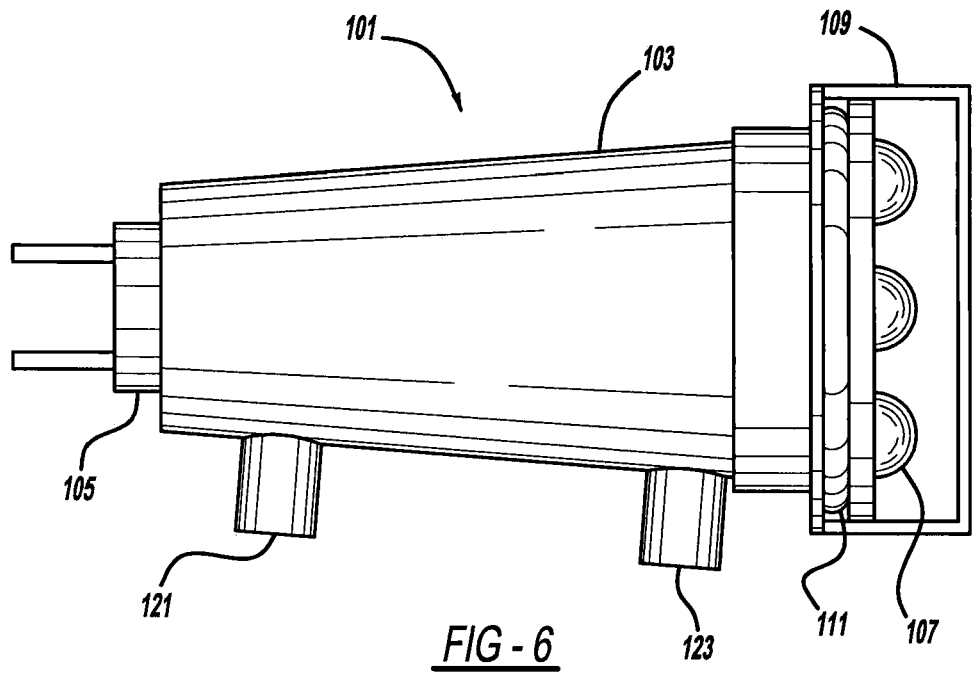
FIG. 6 is a side elevational view showing the assembled lamp.
Figure 7:
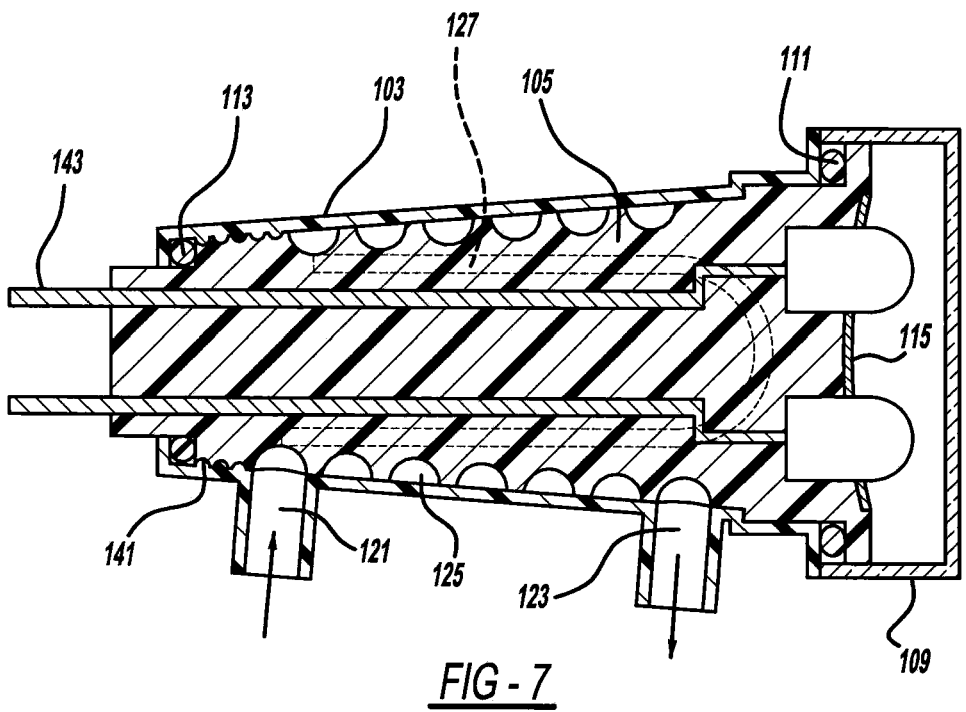
FIG. 7 is a longitudinal sectional view showing the assembled lamp.
Figure 8:
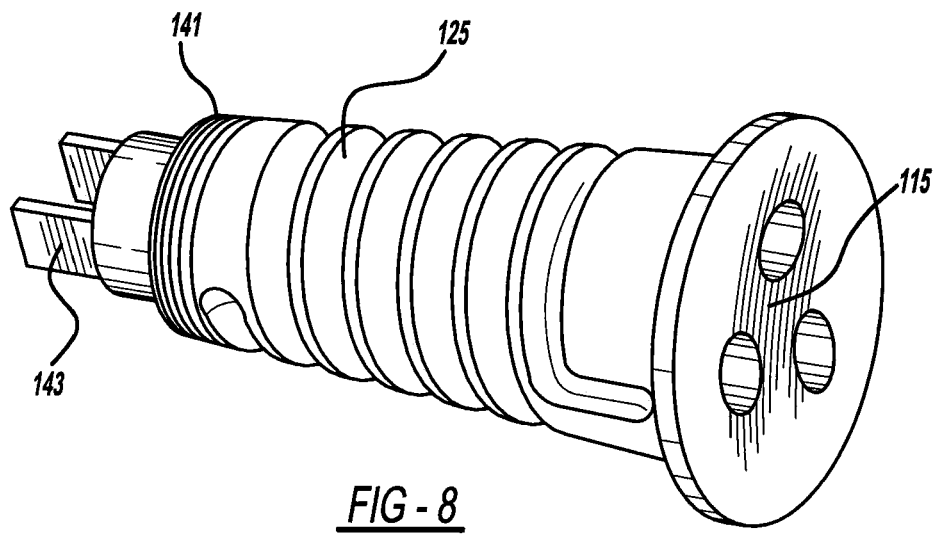
FIG. 8 is a perspective view showing a base employed in the lamp.
Figure 9:
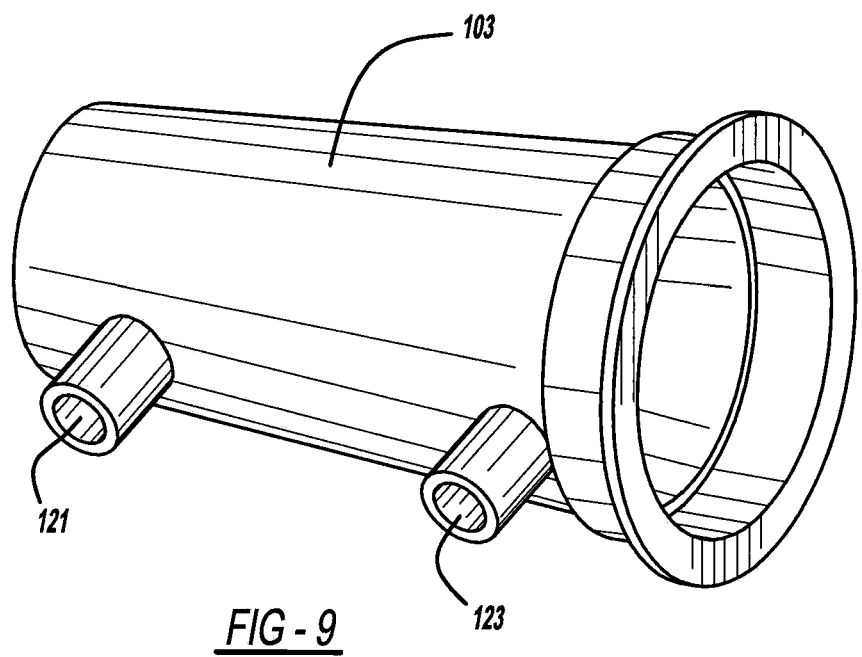
FIG. 9 is a perspective view showing a housing employed in the lamp.

Returning to the manufacture of the lamp embodiment of FIGS. 6 and 7, the present three-dimensional printing advantageously builds up flexible seals 111 and 113 in an essentially simultaneous manner with the same machine head pass while the adjacent rigid reflector layer 115, base 105 and/or housing 103 are built up. The seals are made of a more flexible, UV curable polymer (for one exemplary configuration, DM 9870 material) as compared to the adjacent rigid housing (for one exemplary configuration, Verogray material), and/or base 105. Similarly, in one configuration, lens 109 is additively built up in layers from a UV stable and light transmissive, light curable material integral with the adjacent housing and/or base, thereby defining an essentially enclosed internal LED/bulb cavity but for access to the LEDs. It is noteworthy that in one configuration, seals 111 and 113 are integrally connected and made as a single part with the remainder of the housing 103 and/or base 105 such that post-manufacturing assembly is not required. The seals can optionally have a dovetail engagement within an undercut of the adjacent housing thereby providing an additional mechanical connection to provide extra durability. The cooling passageways 125 and 127 are defined by additively building up the surrounding side walls integral with the base and/or housing.

Exemplary generic three-dimensional printing machines and materials that can be employed to make a washer jet and lamp component as specified herein are disclosed in U.S. Patent Publication Nos. 2010/0217429 entitled "Rapid Production Apparatus" which published to Kritchman et al. on Aug. 26, 2010, 2011/0074065 entitled "Ribbon Liquefier for Use in Extrusion-Based Digital Manufacturing Systems" which published to Batchelder et al. on Mar. 31, 2011, and U.S. Pat. Nos. 7,851,122 entitled "Compositions and Methods for Use in Three Dimensional Model Printing" which issued to Napadensky on Dec. 14, 2010, 7,369,915 entitled "Device, System and Method for Accurate Printing of Three Dimensional Objects" which issued to Kritchman et al. on May 6, 2008, and 5,866,058 entitled "Method for Rapid Prototyping of Solid Models" which issued to Batchelder et al. on Feb. 2, 1999. These patent publications and patents are all incorporated by reference herein. A presently preferred machine is the Connex 500 model from Objet Geometries Inc. but may less preferably be a Dimension Elite fused deposition modeling machine from Stratasys, Inc. Nevertheless, it should be appreciated that manufacturing the washer jets and lamps disclosed herein by the present three-dimensional printing steps also disclosed herein is a significant leap in technology.

While various embodiments have been disclosed herein, and it should be appreciated that other variations may be employed. For example, pre-assembled or separately printed washers, seals, brackets, gaskets, or fasteners can be simultaneously made by the layering and building up process of three-dimensional printing as discussed herein with any of the component embodiments. It should also be realized that while pre-assembled manufacturing is advantageous, the components may be separately manufactured and assembled although many of the present advantages will not be achieved. Additionally, entirely enclosed hollow spaces of predetermined size and shape can be designed and manufactured inside thickened walls of any of the present components in order to save material costs and weight. It is also envisioned that the multi-material alternating pattern embodiment can be used to manufacture the lamp, fasteners or connectors such as those used in the automotive, construction, toy, marine, aerospace and other industries. It is further envisioned that the present three-dimensionally printed features can be applied to an interior lamp mounted to a header panel, side rail panel or interior trim panel when serving as a dome or reading lamp. Moreover, the present three-dimensional printing methods and designs are also applicable to a lamp illuminated by an incandescent bulb, however, certain advantages may not be achieved. Any of the component functions, features and segments thereof may be interchanged with any of the other components disclosed hereinabove, although certain benefits may not be realized. Nevertheless, such changes, modifications or variations are not to be regarded as a departure from the spirit and scope of the present invention.

The invention claimed is:

1. A method of making a component including at least one liquid-carrying passageway, the method comprising:
   (a) creating a first layer of material to define a first section of the component comprising a washer jet;
   (b) emitting light onto the first layer to perform at least one of: (a) hardening, (b) curing or (c) bonding the first layer;
   (c) creating a second layer of the material upon the first layer to define a second section of the component after the prior step;
   (d) emitting light onto the second layer to perform at least one of: (a) hardening, (b) curing or (c) bonding the second layer;
   (e) creating at least a third layer of the material upon the second layer to define at least a third section of the component after the prior step;
   (f) emitting light onto the third layer to perform at least one of: (a) hardening, (b) curing or (c) bonding the third layer; and
   (g) removing the finished component from a machine which performs the creating and emitting steps, with the layers all being integrally connected to their adjacent layers;
   the component being integrally formed as a single piece, functionally durable, made by the machine in less than ninety minutes, and including the at least one liquid-carrying passageway defined by an offset elongated directional configuration.

2. The method of claim 1, further comprising depositing the first layer of the material from a printing head onto a support surface of the machine in an ambient air environment.

3. The method of claim 1, wherein the material is a light curable polymer.

4. The method of claim 1, wherein the material includes at least two different materials deposited in a repeating alternating pattern.

5. The method of claim 1, further comprising creating multiple fluid flow paths within a single piece body.

6. The method of claim 1, further comprising creating a three-dimensionally curved fluid flow path inside a single piece body.

7. The method of claim 1, wherein the light is ultraviolet light which is immediately passed over each layer of the component after it is deposited.

8. The method of claim 1, wherein the washer jet is created as a single piece with washer fluid flowing through the at least one liquid-carrying passageway that is internal to the single piece washer jet.

9. The method of claim 1, further comprising making a flexible section of the component and a more rigid section of the component within at least one of the first layer, the second layer, and the third layer by additively depositing at least two materials of different rigidities within at least one of the layers.

10. A method of making a washer jet, the method comprising:
(a) depositing a layer of material onto a support surface, the layer defining an outer surface of the washer jet;
(b) additively depositing subsequent layers of the material upon each prior layer until the washer jet is completely created;
(c) creating the washer jet to comprise a head including a curved liquid-carrying passageway therein, a body attached to the head, and vehicular panel-engaging wings flexibly extending from the body wherein the head, the body, and the vehicular panel-engaging wings are simultaneously created during the material depositing steps such that the material forming at least two of: the head, the body, and the vehicular panel-engaging wings is deposited within the same layer;
(d) surrounding at least a majority of the washer jet with a gas during the depositing and creating steps; and
(e) curing the washer jet so that the layers of the material bond together.

11. The method of claim 10, wherein the material depositing steps further includes depositing a first material and a second material at different locations within the same layer such that at least two of: the head, the body, and the vehicular panel-engaging wings contain different materials.

12. The method of claim 11, further comprising creating a portion of the passageway in the body in an offset direction from a direction in the head and wherein the second material is more flexible than the first material and at least partially forms the vehicular panel-engaging wings.

13. The method of claim 10, further comprising creating a cap of a different material than the head of the washer jet, the cap being attached to cover an exterior of the head.

14. The method of claim 13, wherein the cap is integrally formed with the head of the washer jet in at least some of the same layer depositing steps.

15. The method of claim 10, further comprising creating at least a second liquid-carrying passageway in the head, the material defining the head surrounding the passageway except at inlet and outlet ends thereof, the head being created as a single piece.

16. The method of claim 10, further comprising creating the washer jet as a single piece with a three-dimensional and oscillating spray pattern flow path being created therein by the additive material depositing.

17. The method of claim 10, further comprising:
creating a frusto-conical, male inlet nozzle coupled to a body extending from the head;
the nozzle being hollow and integrally made with the body which is integrally made with the head.

18. The method of claim 10, wherein the gas is ambient and unpressured air.

19. The method of claim 10, further comprising flowing the material from a machine head positioned above the support surface, at least one of the machine head and the support surface automatically moving relative to the other according to computer instructions in order to create identical multiples of the washer jet in the same machine cycle, free of contraction or expansion due to the manufacture thereof.

20. The method of claim 10, wherein the material is a three-dimensionally printable polymer.

21. The method of claim 10, wherein the material is a polymeric string emitted from a moveable machine head in a continuous manner from a spool which supplies the string to the machine head.

22. The method of claim 10, wherein at least ten of the washer jets are substantially simultaneously printed by a movable machine head in a single machine cycle in less than ninety minutes, the movable machine head and the washer jets being disposed in the gas during all of the single machine cycle.

23. The method of claim 10, further comprising flowing the material from an ink jet printing head including openings arranged in an array such that multiple material flows are simultaneously occurring for each layer of the washer jet.

24. The method of claim 10, further comprising essentially simultaneously creating at least part of the washer jet by depositing a second and different material adjacent the first material, within the same machine cycle, in a repeating and alternating pattern.

25. A method of making a component including at least one passageway, the method comprising:
(a) creating a first layer of material to define a first section of the component which comprises a washer jet;
(b) emitting light onto the first layer to perform at least one of: (a) hardening, (b) curing or (c) bonding the first layer;
(c) creating a second layer of the material upon the first layer to define a second section of the component after the prior step;
(d) emitting light onto the second layer to perform at least one of: (a) hardening, (b) curing or (c) bonding the second layer;
(e) creating at least a third layer of the material upon the second layer to define at least a third section of the component after the prior step;
(f) emitting light onto the third layer to perform at least one of: (a) hardening, (b) curing or (c) bonding the third layer;
(g) creating the washer jet to include a flexible panel engagement segment extending from a stem configured to attach to an automotive vehicular panel with an easier insertion force than extraction force, at least one of the first section, the second section, and the third section including different materials forming the flexible panel engagement segment and the stem respectively; and
(h) removing the finished washer jet from a machine which performs the creating and emitting steps, with the layers all being integrally connected to their adjacent layers.

26. The method of claim 25, further comprising depositing the first layer of the material from a printing head onto a support surface of the machine in an ambient air environment.

27. The method of claim 25, wherein the material is a light curable polymer.

28. The method of claim 25, further comprising creating the at least one passageway to include multiple fluid flow paths within a single piece body of the washer jet, the body being mounted to the stem as a single piece.

29. The method of claim 25, further comprising creating the at least one passageway to include multiple three-dimensionally curved fluid flow paths inside a single piece body of the washer jet wherein the multiple three-dimensionally curved fluid flow paths extend through multiple material layers.

30. The method of claim 25, further comprising creating a head, body, and the flexible panel engagement segment of the washer jet as an integrated piece with multiple three-dimensionally curved fluid-carrying passageways created therein during at least some of the emitting steps.

31. The method of claim 25, further comprising flowing the material from multiple openings of an ink jet printing head such that different streams of the material simultaneously flow for each layer of the washer jet.

32. The method of claim 25, wherein the material is a three-dimensionally printable polymer.

33. The method of claim 25, further comprising creating a cap of a different material than a head of the washer jet, the cap being attached to cover an exterior of a head, and the head containing at least a section of the at least one passageway therein.

34. The method of claim 25, further comprising creating the washer jet as a single piece with a three-dimensional and oscillating spray pattern flow path being created therein by the additive material layering.

35. The method of claim 25, further comprising:
creating a frusto-conical, male inlet nozzle coupled to a body extending from a head;
the nozzle being hollow and integrally made with the body which is integrally made with the head;
at least a section of the at least one passageway being contained internally within the body; and
the at least one passageway being connected to the nozzle.

36. The method of claim 25, further comprising creating the washer jet as a single piece with a head having an exterior portion formed of a material that is different from the material forming the flexible panel engagement segment and the stem, the material forming the exterior portion of the head being resistant to deterioration caused by ultra-violet light.

37. The method of claim 25, further comprising creating the washer jet as a single piece with a head having an exterior portion formed of a material that is different from the material forming the flexible panel engagement segment and the stem, the material forming the exterior portion of the head having a different color than the material forming the flexible panel engagement segment and the stem.

* * * * *